US009058212B2

(12) United States Patent
Wang et al.

(10) Patent No.: US 9,058,212 B2
(45) Date of Patent: Jun. 16, 2015

(54) COMBINING MEMORY PAGES HAVING IDENTICAL CONTENT

(75) Inventors: Landy Wang, Kirkland, WA (US); Mehmet Iyigun, Bellevue, WA (US); Yevgeniy Bak, Redmond, WA (US); Vijay Sundaram, Bellevue, WA (US); Pavlo L. Lebedynskiy, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 554 days.

(21) Appl. No.: 13/052,562

(22) Filed: Mar. 21, 2011

(65) Prior Publication Data

US 2012/0246436 A1 Sep. 27, 2012

(51) Int. Cl.
G06F 12/00 (2006.01)
G06F 9/50 (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS

| | | | | | |
|---|---|---|---|---|---|
| 5,321,834 | A | * | 6/1994 | Weiser et al. | 1/1 |
| 5,379,398 | A | * | 1/1995 | Cohn et al. | 711/154 |
| 5,692,178 | A | * | 11/1997 | Shaughnessy | 1/1 |
| 5,964,867 | A | * | 10/1999 | Anderson et al. | 712/219 |
| 5,987,477 | A | * | 11/1999 | Schmuck et al. | 1/1 |
| 6,611,907 | B1 | * | 8/2003 | Maeda et al. | 711/170 |
| 6,789,156 | B1 | | 9/2004 | Waldspurger | |
| 6,990,667 | B2 | * | 1/2006 | Ulrich et al. | 718/105 |
| 7,290,110 | B2 | * | 10/2007 | Loafman | 711/170 |
| 7,472,242 | B1 | * | 12/2008 | Deshmukh et al. | 711/162 |
| 7,500,048 | B1 | | 3/2009 | Venkitachalam | |
| 7,702,876 | B2 | * | 4/2010 | Brockmann | 711/170 |
| 7,721,064 | B1 | | 5/2010 | Lam et al. | |
| 7,734,864 | B2 | * | 6/2010 | Maeda et al. | 711/103 |
| 7,877,570 | B2 | * | 1/2011 | Schneider | 711/202 |
| 7,899,982 | B2 | * | 3/2011 | Maeda et al. | 711/103 |
| 8,332,569 | B2 | * | 12/2012 | Kim et al. | 711/5 |
| 2008/0184001 | A1 | * | 7/2008 | Stager | 711/167 |
| 2008/0244204 | A1 | * | 10/2008 | Cremelie et al. | 711/162 |
| 2008/0244210 | A1 | * | 10/2008 | Vingralek et al. | 711/170 |
| 2008/0307192 | A1 | * | 12/2008 | Sinclair et al. | 711/218 |
| 2009/0177857 | A1 | * | 7/2009 | Butterworth et al. | 711/162 |
| 2009/0204649 | A1 | * | 8/2009 | Wong et al. | 707/204 |

(Continued)

OTHER PUBLICATIONS

David Geer, "Reducing the Storage Burden Via Data Deduplication", Computer, Dec. 2008, vol. 41, Issue 12, pp. 15-17.*

(Continued)

*Primary Examiner* — Christopher Birkhimer
(74) *Attorney, Agent, or Firm* — John Jardine; Kate Drakos; Micky Minhas

(57) ABSTRACT

In a device having a memory accessed as multiple pages, two or more pages of the multiple pages having identical content are identified. While the two or more pages are being identified, other processes running in the device are allowed to use the two or more pages, including being allowed to change cache attributes of each of the two or more pages. The two or more pages are combined into a single combined page (e.g., a newly allocated page of the multiple pages), and a process page record having multiple entries pointing to the multiple pages is updated so that entries that previously pointed to one of the two or more pages instead point to the single page.

20 Claims, 5 Drawing Sheets

(56) References Cited

U.S. PATENT DOCUMENTS

| | | | |
|---|---|---|---|
| 2009/0204765 A1* | 8/2009 | Gupta et al. | 711/133 |
| 2009/0216788 A1* | 8/2009 | Rao et al. | 707/101 |
| 2009/0287902 A1 | 11/2009 | Fullerton et al. | |
| 2010/0030998 A1 | 2/2010 | Kiriansky | |
| 2010/0070715 A1* | 3/2010 | Waltermann et al. | 711/129 |
| 2010/0082529 A1* | 4/2010 | Mace et al. | 707/609 |
| 2010/0082700 A1* | 4/2010 | Parab | 707/803 |
| 2010/0088349 A1* | 4/2010 | Parab | 707/802 |
| 2010/0094813 A1* | 4/2010 | Brueggemann et al. | 707/692 |
| 2010/0094817 A1* | 4/2010 | Ben-Shaul et al. | 707/697 |
| 2010/0198797 A1* | 8/2010 | Wideman | 707/692 |
| 2010/0287347 A1 | 11/2010 | Cameron et al. | |
| 2011/0066628 A1* | 3/2011 | Jayaraman | 707/758 |

OTHER PUBLICATIONS

B.J. Austin, "A Dynamic Disk Allocation Algorithm Designed to Reduce Fragmentation During File Reloading", The COmputer Journal, 1971, pp. 378-381.*

Jim Handy, "The Cache Memory Book: The Authoritative Reference on Cache Design", Second Edition, 1998, pp. 165-186.*

Margaret Rouse, "Cyclic Redundancy Checking", Mar. 2010, pp. 1-16, http://searchnetworking.techtarget.com/definition/cyclic-redundancy-checking.*

Kan Yabumoto, XXCOPY Technical Bulletin #06, Jan. 17, 2000, pp. 1-6, http://www.xxcopy.com/xxcopy06.htm.*

Waldspurger, Carl A., "Memory Resource Management in VMware ESX Server", Retrieved at << http://waldspurger.org/carl/papers/esx-mem-osdi02.pdf >>, Proceedings of the 5th symposium on Operating systems design and implementation, Dec. 2002, p. 1-14.

Forbes, Justin M., "KSM FedoraProject", Retrieved at << http://fedoraproject.org/wiki/Features/KSM >>, Mar. 2, 2010, pp. 3.

Smith, et al., "Effects of Copy-on-Write Memory Management on the Response Time of UNIX Fork Operations", Retrieved at << http://www.cis.upenn.edu/~jms/cw-fork.pdf >>, 1988, pp. 10.

Jeon, et al., "Domain Level Page Sharing in Xen Virtual Machine Systems", Retrieved at << http://www.cs.rice.edu/~mj6/paper/appt07.pdf >>, Proceedings of the 7th international conference on Advanced parallel processing technologies, 2007, pp. 10.

* cited by examiner

COMBINING MEMORY PAGES HAVING IDENTICAL CONTENT

BACKGROUND

Computers have become increasingly commonplace, with users desiring to run an increasing number and variety of programs on their computers. Increasing the number of programs run on a computer can be problematic because it can result in situations in which the resources, such as available memory, of the computer are strained. Straining such resources can result in slow or sluggish operation of the computer, reducing the user friendliness of the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a device having a memory accessed as multiple pages, two or more pages of the multiple pages having identical content are identified. While the two or more pages are being identified, other processes running in the device are allowed to use the two or more pages, including being allowed to change cache attributes of each of the two or more pages. The two or more pages are combined into a single combined page, and a process page record having multiple entries pointing to the multiple pages is updated so that entries that previously pointed to one of the two or more pages instead point to the single page.

In accordance with one or more aspects, in a device having a memory accessed as multiple pages, two or more pages of the multiple pages having identical content are identified. A new page of the multiple pages is allocated, the new page having the identical content as the two or more pages. A process page record having multiple entries identifying the multiple pages is updated so that entries that previously pointed to one of the two or more pages instead point to the new page.

BRIEF DESCRIPTION OF THE DRAWINGS

The same numbers are used throughout the drawings to reference like features.

DETAILED DESCRIPTION

Combining memory pages having identical content is discussed herein. A set of policies are applied to determine a time to analyze physical memory pages of a device in order to identify physical memory pages having identical content. Other processes are allowed to use the memory pages during this analysis. If multiple memory pages have identical content, then the multiple memory pages are combined into a single memory page and the appropriate process page table entries (or other record entries) are updated to point to this single memory page. If a process subsequently writes to the single memory page, then a new page is allocated to that process and the appropriate process page table entry is updated so that the entry for that process points to the new page rather than to the combined page.

Figure 1:
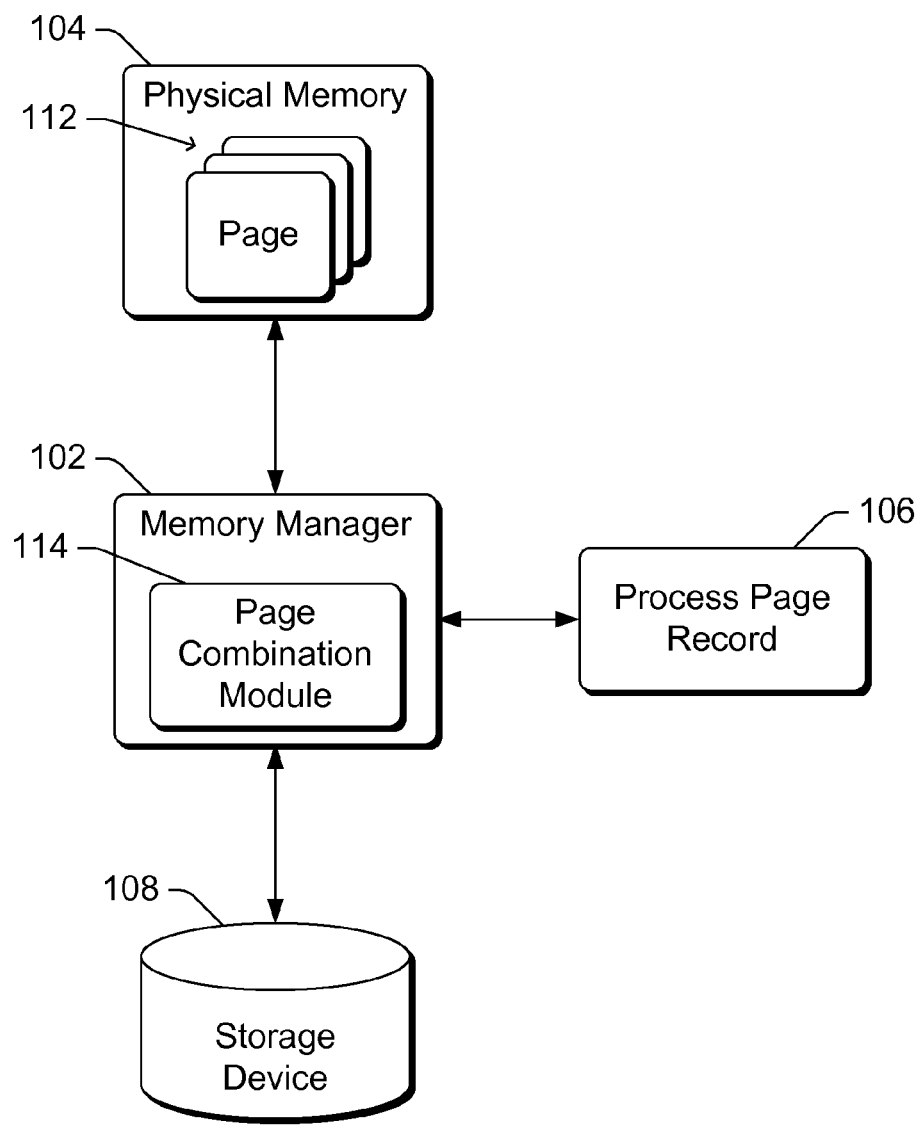
FIG. 1 illustrates an example system implementing the combining memory pages having identical content in accordance with one or more embodiments.

FIG. 1 illustrates an example system 100 implementing the combining memory pages having identical content in accordance with one or more embodiments. System 100 includes a memory manager 102, physical memory 104, a process page record 106, and a storage device 108. System 100 can be implemented by a variety of different types of devices. For example, system 100 can be implemented by a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

Physical memory 104 is one or more memory components (e.g., memory chips) that are physically present in system 100. Physical memory 104 can be made up of a variety of different types of memory components, such as random access memory (RAM), flash memory, and so forth. Physical memory 104 is organized or accessed in blocks of memory referred to as pages 112. Multiple pages 112 are illustrated in physical memory 104, each page 112 including a particular amount of physical memory (e.g., a particular number of bytes of physical memory), referred to as the size of the page. Each page 112 is typically the same size, although the size of pages 112 can vary by implementation.

Memory manager 102 manages physical memory 104 for system 100. Various different processes (e.g., applications or programs being run) in system 100 can request pages of memory. Memory manager 102 responds to such requests, allocating pages of memory to the requesting process. Memory manager 102 can also implement a virtual memory space in which memory addresses referenced by processes are virtual addresses that are mapped by memory manager 102 to particular addresses in physical memory 104. Different pages 112 can be allocated to different processes, and memory manager 102 maintains a process page record 106 that identifies which pages 112 are allocated to which processes at various times. This process page record can alternatively be one or more process page tables and/or other data structures.

Storage device 108 can be a variety of different types of storage devices, such as one or more magnetic disks, one or more optical discs, flash memory, combinations thereof, and so forth. Memory manager 102 can optionally implement paging functionality in which pages 112 can be transferred to storage device 108 when not currently being used by a process in system 100, and transferred back to physical memory 104 when a process in system 100 desires to use such pages 112. Storage device 108 is typically a slower but larger device than physical memory 104. Accordingly, storage device 108 can typically store many more pages 112 than physical memory 104, but it typically takes more time for memory manager 102 to retrieve a page 112 from storage device 108 than from physical memory 104.

Memory manager 102 also includes a page combination module 114. Situations can arise in which different pages 112 have identical content (the data stored in the physical memory components of those pages are the same). These different pages 112 can include pages allocated to the same process as well as pages allocated to different processes. Page combination module 114 analyzes pages 112, identifying multiple pages 112 having identical content and combining those multiple pages 112 into a single page 112. Page combination module 114 also updates the appropriate entries of process page record 106 so that entries that previously pointed to one of the multiple pages 112 instead point to the combined page. This identification, combination, and updating performed by page combination module 114 is also referred to herein as a page combination procedure. If a process subsequently attempts to write to the combined page, memory manager 102 allocates a new page 112 for that process, updates the appropriate entry of process page record 106 to point to this new page 112 rather than the combined page, and allows the process to write to this new page 112.

The discussion herein refers to combining pages of memory having identical content. Depending on the manner in which system 100 is implemented or designed, some pages may be combinable whereas other pages are not combinable. The combining memory pages having identical content techniques discussed herein operate based on combinable pages and do not combine pages that are not combinable. Various different types of pages can be combinable in different embodiments, such as user mode process pages, kernel mode process pages, session space pages, and so forth. Additionally, pages in various different states can be combinable, such as pages marked as dirty, pages marked as clean, pages included in a working set of pages, pages included on various memory lists (e.g., standby, modified, etc.), and so forth.

Figure 2:
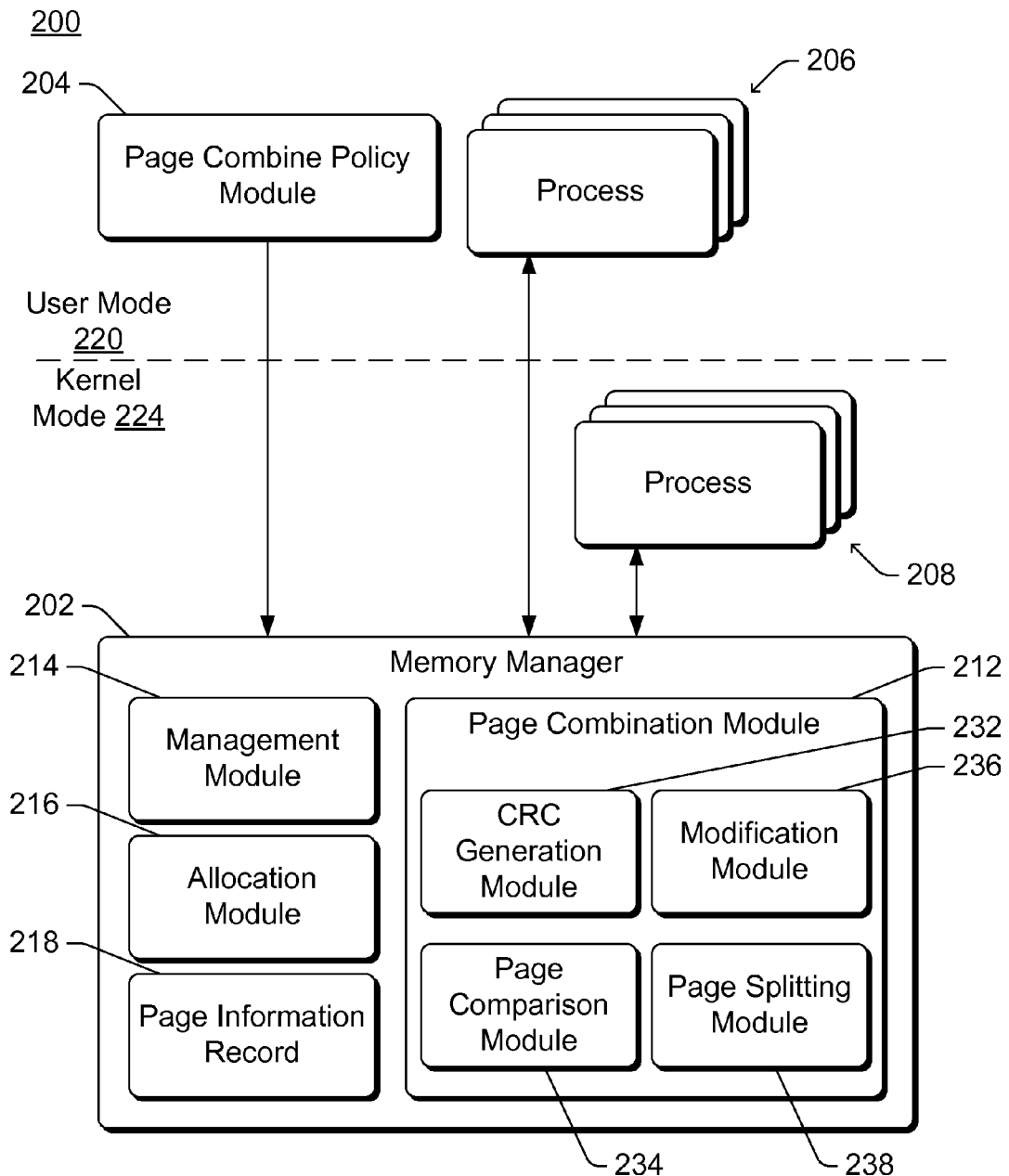
FIG. 2 illustrates an example system including components implementing the combining memory pages having identical content in accordance with one or more embodiments.

FIG. 2 illustrates an example system 200 including components implementing the combining memory pages having identical content in accordance with one or more embodiments. System 200 includes a memory manager 202, which can be a memory manager 102 of FIG. 1. System 200 also includes a page combine policy module 204, one or more processes 206, and one or more processes 208.

Memory manager 202 manages physical memory, such as pages 112 of physical memory 104 of FIG. 1. Memory manager 202 includes a page combination module 212, a management module 214, an allocation module 216, and a page information record 218. Page combination module 212, which can be a page combination module 114 of FIG. 1, manages combining physical pages having identical content as discussed in more detail below. Allocation module 216 manages allocating or assigning particular pages of physical memory to different processes 206 and/or 208. Pointers to these pages, as allocated to each process 206 and/or 208, are maintained in one or more process page records (such as a process page record 106 of FIG. 1). Management module 214 can perform various other memory management functionality, such as responding to requests from process 206 and/or 208, transferring pages between physical memory and a storage device, converting between physical and virtual memory addresses, and so forth.

Page information record 218 is one or more data structures maintaining information used by page combination module 212, management module 214, and/or allocation module 216. Page information record 218 can be maintained as one or more tables or alternatively other data structures. In one or more embodiments, page information record 218 includes one or more process page tables (e.g., one or more process page tables included as process page record 106 of FIG. 1).

Page information record 218 can also include additional data used by page combination module 212 in carrying out the combining physical pages having identical content techniques discussed herein. This additional data can be included as part of a process page record, or alternatively as part of one or more other tables and/or other data structures. This additional data is used by page combination module 212 is discussed in more detail below.

System 200 employs an architecture including a user mode 220 and a kernel mode 224. These different modes refer to different levels or security partitions of system 200. Kernel mode 224 is a higher security or more privileged level than user mode 220. Operating system components, such as memory managers, device drivers, system management modules, and so forth typically execute in kernel mode 224, whereas other components typically execute in user mode 220. Components in user mode 220 are prevented from directly accessing components in kernel mode 224, but can interact with components in kernel mode 224 via one or more interfaces exposed by the components executing in kernel mode. These different modes or levels can be implemented in a variety of different conventional manners, such as using different processor rings. Although two modes or levels are illustrated in FIG. 2, it should be noted that different numbers of modes or levels can alternatively be used (e.g., three or more levels).

Page combine policy module 204 and processes 206 execute in user mode 220, whereas memory manager 202 and processes 208 execute in kernel mode. Page combine policy module 204 tracks various information regarding system 200, and identifies to memory manager 202 when to initiate the page combination procedure as discussed in more detail below. It should be noted that, although illustrated as executing in user mode, at least part of page combine policy module 204 can alternatively execute in kernel mode.

Additionally, in one or more embodiments system 200 is implemented on a device that supports different priority levels for processes running on the device. Processes assigned a higher priority level are given priority to run over processes assigned a lower priority level (e.g., higher priority level processes can be given more processor time (or processor cores) or other resource bandwidth). In such embodiments, page combination module 212 can execute as a low priority process whereas processes 206 and 208 execute as higher priority processes.

Page combination module 212 performs the page combination procedure, identifying and combining physical pages having identical content. Page combination module 212 includes a cyclic redundancy check (CRC) generation module 232, a page comparison module 234, a modification module 236, and a page splitting module 238. Page combination module 212 can perform the page combination procedure at various times. In one or more embodiments, page combine policy module 204 determines when page combination module 212 is to perform the page combination procedure and notifies page combination module 212 (e.g., by invoking an interface exposed by page combination module 212) to begin the page combination procedure. In other embodiments, page combination module 212 can determine to begin the page combination procedure in response to an indication to do so from another module or component of system 200, in response to an indication to do so from another device coupled to the device implementing system 200, based on its own analysis or tracking of information, combinations thereof, and so forth.

When it is time for page combination module 212 to perform the page combination procedure, CRC generation module 232 generates a CRC value for each page of physical memory being analyzed. All pages of physical memory can be analyzed, or alternatively a subset of physical memory pages can be analyzed. A particular subset of physical memory pages to be analyzed can be determined by page combination module 212 or another component or module (e.g., page combine policy module 204) in different manners, such as classifying pages of different types into subsets and selecting a subset, selecting a particular number of pages to be included in a subset, selecting a specific physical page range to be included in a subset, and so forth. The page combination procedure is performed based on pages in physical memory (e.g., pages 112 of FIG. 1) rather than virtual pages or pages stored elsewhere (although some pages may be transferred in from a storage device as discussed in more detail below). CRC generation module 232 can use any of a variety of publicly available and/or proprietary techniques to generate a CRC value for a page of physical memory based on the content of the page. Alternatively, one or more other hash functions or other algorithms can be applied to the content of a page to generate a value to be used in place of the CRC value. Thus, although CRC values and the generation of CRC values are discussed herein, alternatively other values and hash functions or other algorithms that generate such other values can alternatively be used in place of the CRC values and the generation of CRC values discussed herein.

CRC generation module 232 maintains a record of the CRC values generated for each page of physical memory. This record can be maintained, for example, as part of page information record 218.

It should be noted that, while CRC generation module 232 is generating CRC values for pages of physical memory, other processes in system 200 (e.g., processes 206 and/or 208) are allowed to continue using those pages. CRC generation module 232 need not lock or otherwise prevent other processes in system 200 from using those pages. For example, in parallel with CRC generation module 232 generating a CRC value for a page, a process 206 and/or 208 can read from that page, write to that page, transfer that page to another process 206 and/or 208, change a cache attribute of that page, and so forth.

In one or more embodiments, CRC generation module 232 maintains an identifier in page information record 218 of each of one or more pages of physical memory for which a CRC value is being generated at any given time. This identifier can be maintained, for example, as a flag value associated with the page of physical memory. The flag value can be included as part of the process page record or alternatively as part of a separate table or other data structure. If a request to use the page is received from a process 206 and/or 208 while the CRC value is being generated for that page, and if the request could potentially result in a memory coherency or corruption situation, CRC generation module 232 ceases generating the CRC value for that page and allows the request to be performed. CRC generation module 232 can re-calculate the CRC value for that page when the request has been completed, or alternatively can skip the page for the current page combination procedure being performed by page combination module 212 (however, the CRC value for that page can be re-calculated the next time page combination module 212 performs the page combination procedure).

A memory coherency or corruption situation refers to a situation where different pages (whether in physical memory or stored elsewhere) that are expected to have identical content may have different content. One example of a type of request that can potentially result in a memory coherency or corruption situation is a change to an attribute of the page, such as a cache attribute of the page. For example, the device implementing system 200 oftentimes allows a physical page of memory to have a single cache attribute (such as one of cached, non-cache, or write-combine) at any given time. A process 206 and/or 208 is permitted to change the cache attribute of a page while CRC generation module 232 is calculating the CRC value for that page, but the request is deemed as potentially resulting in a memory coherency or corruption situation.

Other types of requests can also potentially result in a memory coherency or corruption situation, depending on the manner in which system 200 is designed and/or implemented. For example, a request to write data to an address included in the page would be a request that can potentially result in a memory coherency or corruption issue.

Page comparison module 234 analyzes the CRC values generated by CRC generation module 232 and identifies matching CRC values. Two CRC values are matching CRC values if they are the same value. In one or more embodiments, an association between the CRC values generated by CRC generation module 232 and the pages for which the CRC values are generated is maintained. The CRC values generated by CRC generation module 232 are sorted (e.g., in ascending or descending numerical order) so that different pages having the same CRC value can be readily identified. Alternatively, CRC values generated by CRC generation module 232 can be sorted and/or searched in a variety of other conventional manners in order to identify matching CRC values.

For multiple pages having the same CRC value, page comparison module 234 compares the pages to one another and checks whether the multiple pages have identical content. Two pages have identical content if the data stored in the physical memory components of those pages are the same and the attributes (e.g., cache attributes) of the two pages are the same. Additionally, in one or more embodiments in order for two pages to have identical content any page protections associated with the two pages also have to be the same. Different page protections can be associated with pages in different embodiments, the page protections identifying how the pages can be used in system 200. For example, pages can be mapped or allocated with "ReadWrite" page protection to indicate data can be read from and written to the pages, can be mapped or allocated with "Read" page protection to indicate data can be read from but not written to the pages, can be mapped or allocated with "ReadWriteExecute" page protection to indicate data can be read from, written to, and executed from the pages, and so forth. Thus, following this example, if one page were mapped or allocated with "ReadWrite" page protection and another were mapped or allocated with "ReadWriteExecute" page protection, the two pages are not considered as having identical content.

The comparison of whether two pages have identical content is performed in a manner that protects against the pages being changed (e.g., the content, attribute, page protection, etc. of either page being changed) during the comparison. This protection against changes can be performed in different manners. For example, page comparison module 234 can cease the comparison if there is a request to write to either page or to change of attributes or page protections of either page. Such requests are allowed to be performed, and page comparison module 234 can re-start the comparison for those pages when the request has been completed, or alternatively can skip the comparison for the current page combination procedure being performed by page combination module 212 (e.g., analogous to ceasing generating a CRC value for a page if a request that could potentially result in a memory coherency or corruption situation is received as discussed above).

Alternatively, any writing of data to the pages or changing of attributes or page protections during the comparison can be prevented (e.g., access to the pages being compared can be locked so that only page combination module 212 has access to the pages).

Page comparison module 234 notifies modification module 236 of two or more pages that have identical content, which in turn can combine two or more pages having identical content into a single page. The combination of two or more pages having identical content can be performed in different manners. In one or more embodiments, modification module 236 has a new page of physical memory allocated (e.g., by allocation module 216), this new page also being referred to as a combined page. The combined page has the same attributes, page protections, and so forth as the two or more page being combined. Modification module 236 copies the content of one of the two or more pages to the combined page, and updates the process page record so that entries in the process page record that previously pointed to one of the two or more pages having identical content instead point to the combined page. Modification module 236 also has the two or more pages de-allocated (e.g., by allocation module 216), thereby freeing the two or more pages for allocation to other processes or for other use as desired by system 200.

In one or more embodiments, the combined page is allocated in a way that reduces the fragmentation of physical memory. For example, the new page could be located in a portion at the high end of physical memory (e.g., a particular number of pages or a particular percentage of physical memory having the largest physical memory addresses in a device including system 200), or in a portion at the low end of physical memory (e.g., a particular number of pages or a particular percentage of physical memory having the smallest physical memory addresses in a device including system 200). This results in the combined pages being grouped approximately together in a particular area of physical memory rather than being interspersed among pages allocated to various processes 206 and/or 208.

Additionally, it should be noted that in some situations system 200 is implemented in a device that is one node in a collection or cluster of nodes. In such situations, the new page of physical memory is typically located in physical memory on the device implementing system 200 rather than in physical memory of another device. The new page of physical memory is typically not located on a device or in a node other than that in which system 200 is implemented.

Alternatively, rather than allocating a new page of memory to be the combined page, modification module 236 can select one of the multiple pages having identical content as the combined page. Modification module 236 can select the one of the multiple pages that is to be the combined page according to various criteria, such as selecting the page having the smallest physical memory addresses in a device implementing system 200, selecting the page having the largest physical memory addresses in a device implementing system 200, selecting one of the multiple pages randomly or according to other rules or criteria, and so forth.

Modification module 236 also updates the process page record so that each entry in the process page record that previously pointed to one of the multiple pages having identical content instead points to the combined page. It is to be appreciated that the entry in the process page record that points to the page selected as the combined page need not be updated, but that the entries in the process page record that point to other of the multiple pages are updated. Modification module 236 also has ones of the multiple pages other than the combined page de-allocated (e.g., by allocation module 216), thereby freeing those pages for allocation to other processes or for other use as desired by system 200.

The combined page, regardless of whether a newly allocated page or a selected one of the multiple pages having identical content, is also marked by modification module 236 as being a "copy on write" page. The "copy on write" marking indicates to memory manager 202 that, if a write request to the combined page is subsequently received, the combined page is to be copied and the copy written to rather than the combined page. This allows page splitting module 238 to split the copy of the combined page into a separate page for the process to write to, as discussed in more detail below. The "copy on write" marking can be maintained, for example, in the process page record or alternatively in other tables or data structures of page information record 218.

Additionally, in one or more embodiments modification module 236 maintains a reference count identifying how many entries of the process page record reference or point to the combined page. This reference count thus also identifies how many of the multiple pages had the identical content as the combined page. The reference count is incremented if additional pages are identified that have identical content as the combined page, and decremented if a copy of the combined page is split out by splitting module 238.

The CRC values generated by CRC generation module 232 are maintained in page information record 218 along with an indication of the page in physical memory corresponding to each CRC value. The CRC values maintained in page information record 218 include CRC values for the combined pages. The CRC values are maintained after each page combination procedure is performed by page combination module 212, and are available for subsequent page combination procedures performed by page combination module 212.

In one or more embodiments, in addition to comparing CRC values generated as part of the current page combination procedure, page comparison module 234 compares CRC values generated by CRC generation module 232 to CRC values of previously combined pages. For one or more pages having the same CRC value as a combined page, page comparison module 234 checks whether each of the one or more pages has identical content as the combined page. For each page having identical content as the combined page, modification module 236 updates the process page record so that entries in the process page record previously pointing to each such page instead point to the combined page. Modification module 236 also has each such page de-allocated (e.g., by allocation module 216), thereby freeing each such page for allocation to other processes or for other use as desired by system 200. Additionally, modification module 236 increments the reference count of the combined page for each such page having identical content as the combined page.

Alternatively, page comparison module 234 does not compare CRC values generated by CRC generation module 232 to CRC values of previously combined pages. Rather, CRC values of previously combined pages are ignored by page comparison module 234, and module 234 relies on just the CRC values generated by CRC generation module 232 during the current page combination procedure being performed by page combination module 212. Additionally, in such situations the page information records which contain the CRC values can be freed after the current page combination procedure is finished.

Additionally, in one or more embodiments in which pages of physical memory can be transferred to a storage device (e.g., storage device 108 of FIG. 1), page comparison module 234 compares CRC values generated by CRC generation module 232 to CRC values of previously combined pages that have been transferred to the storage device. A record of the CRC values of combined pages that have been transferred to a storage device is maintained in page information record 218 even though such pages are not currently in physical memory. Each combined page stored in the storage device and having a CRC value that is the same as a CRC value generated by CRC generation module 232 as part of the current page combination procedure is transferred from the storage device to physical memory. Page comparison module 234 then proceeds to check whether each of the one or more pages having the same CRC value as the combined page has identical content as the combined page, as discussed above.

Alternatively, in other embodiments page comparison module 234 does not compare CRC values generated by CRC generation module 232 to CRC values of previously combined pages that have been transferred to the storage device. Rather, page comparison module 234 proceeds to compare CRC values generated by CRC generation module 232 as part the current page combination procedure to one another, and to previously combined pages in physical memory as discussed above.

A process 206 and/or 208 can provide a request to memory manager 202 to use a page that points to the combined page. If such a request cannot potentially modify the combined page (e.g., the request is a read request), then memory manager 202 proceeds to respond to the request using the combined page (e.g., content from the combined page is returned to the request).

However, if such a request can potentially modify the combined page (e.g., the request is write request or a request to change the cache attribute of the page), page splitting module 238 allocates (e.g., by allocation module 216) a new page and copies the contents of the combined page to the new page. Page splitting module 238 also updates the process page record so that the entry in the process page record for the requesting process that previously pointed to the combined page instead points to the new page. Additionally, modification module 236 decrements the reference count of the combined page to reflect that one fewer process page record entries point to the combined page. Memory manager 202 then proceeds to respond to the request using the new page rather than the combined page.

Additionally, in one or more embodiments page splitting module 208 checks whether the reference count of the combined page, after being decremented, reflects that no process page record entries point to the combined page. For example, page splitting module 208 checks whether the reference count of the combined page is zero. If the reference count of the combined page indicates that no process page record entries point to the combined page then page splitting module 238 also de-allocates the combined page (e.g., by allocation module 216), thereby freeing the combined page for allocation to other processes or for other use as desired by system 200. On the other hand, if the reference count of the combined page indicates that one or more page record entries still point to the combined page, then the combined page is not de-allocated.

Alternatively, in other embodiments page splitting module 208 can check, prior to generating a new page, whether the reference count of the combined page reflects that only one process page record entry points to the combined page. For example, page splitting module 208 checks whether the reference count of the combined page is one. If the reference count of the combined page indicates that only one process page record entry points to the combined page, rather than allocating a new page and copying the content of the combined page to the new page, the combined page can simply be no longer treated as a combined page. The "copy on write" marking on the combined page can be removed, the reference count decremented, and the process can be permitted to write to that page.

It should be noted that page combination module 212 does not interfere with the usage of pages of physical memory by processes 206 and/or 208. However, requests received while page combination module 212 is performing the page combination procedure can result in a change to a page being analyzed by module 212 (e.g., a write request to a memory address included on the page). Page combination module 212 responds to such requests by skipping or otherwise terminating analysis of that page. For example, if a received request writes to a memory address included on one of two pages that are being compared to determine whether they include identical content, then the comparison stops. The write request is permitted to continue, and the page including a memory address written to is no longer compared to other pages to determine whether it is to be combined into a combined page. However, the page can again be analyzed during subsequent page combination procedures performed by page combination module 212.

In one or more embodiments, page combine policy module 204 determines when page combination module 212 is to perform the page combination procedure and notifies page combination module 212 (e.g., by invoking an interface exposed by page combination module 212) when to begin the page combination procedure. Page combine policy module 204 can implement a variety of different policies to determine when to indicate to page combination module 212 to perform the page combination procedure. Generally, the policies used by page combine policy module 204 balance the desire to perform the page combination procedure frequently so as to combine a large number of pages against the desire to perform the page combination procedure infrequently so as to reduce resource usage (e.g., processors, processor cores, battery, memory bandwidth, etc.) by page combination module 212. Page combine policy module 204 can be configured with (e.g., programmed with or configured by a user or administrator of the device implementing system 200) or otherwise obtain (e.g., from another component, module, device, etc.) one or more policies to determine when to indicate to page combination module 212 to perform the page combination procedure.

In one or more embodiments, page combine policy module 204 monitors various aspects of system 200 and/or a device implementing system 200, recording various data regarding these aspects. Page combine policy module 204 can collect data regarding various aspects of system 200 itself, or alternatively obtain data regarding various aspects of system 200 from other components or modules (e.g., process 206 and/or 208, memory manager 202, and so forth). Page combine policy module 204 uses this recorded data, in combination with one or more policies, to determine when to indicate to page combination module 212 to perform the page combination procedure. These various aspects of system 200 and/or the device implementing system 200 can include a user state, memory usage, a duration since last analysis, memory pressure, memory contents, system startup, combinations thereof, and so forth.

The user state refers to whether a user of system 200 is detected as being away from system 200 (as opposed to being present at system 200). Page combine policy module 204 can analyze various inputs to determine whether a user is away from system 200, such as the presence of keyboard or touchscreen activity, the presence of audible inputs, the presence of motion detected by an image capture device, and so forth. Page combine policy module 204 indicates to page combination module 212 to perform the page combination procedure after the user has been away from system 200 for at least a threshold amount of time (e.g., one hour). Alternatively, if the user is not detected as being away from system 200 for at least the threshold amount of time, then page combine policy module 204 can indicate to page combination module 212 to perform the page combination procedure at particular intervals (e.g., approximately hourly).

The memory usage refers to how much of the physical memory is currently being used by system 200. If at least a threshold amount of the physical memory is not being used (e.g., has not been allocated by allocation module 216), then page combine policy module 204 does not indicate to page combination module 212 to perform the page combination procedure. This threshold amount can be a fixed amount (e.g., a particular number of pages) or a relative amount (e.g., a particular percentage of the total number of pages in physical memory).

The memory usage can also refer to changes in the amount of memory being used by system 200 (e.g., changes in the amount of memory that has been allocated by allocation module 216). In response to an increase in the amount of memory being used, page combine policy module 204 indicates to page combination module 212 to perform the page combination procedure. This increase in the amount of memory being used can be an increase of a threshold amount of memory within a particular amount of time. This threshold amount of memory can be a fixed amount (e.g., a particular number of pages) or a relative amount (e.g., a particular percentage of the total number of pages in physical memory or a particular percentage of the number of pages in physical memory that were being used prior to the particular amount of time elapsing). This particular amount of time can be a fixed amount (e.g., a particular number of seconds or minutes) or a relative amount (e.g., a particular percentage of the time since the device implementing system 200 was booted).

The duration since last analysis refers to the amount of time that has elapsed since page combination module 212 last performed (e.g., began, completed, etc.) the page combination procedure. Page combine policy module 204 does not indicate to page combination module 212 to perform the page combination procedure until at least a threshold amount of time has elapsed since page combination module 212 last performed the page combination procedure. This threshold amount of time can be, for example, a particular number of seconds, minutes, hours, and so forth (e.g., 15 minutes). This threshold amount of time can also vary based on an amount of physical memory being used by system 200 (e.g., an amount of memory that has been allocated by allocation module 216). For example, the threshold amount of time can decrease as the amount of physical memory being used increases, and the threshold amount of time can similarly increase as the amount of physical memory being used decreases. This threshold amount of time can also vary based on other characteristics of system 200 (e.g., the threshold amount of time can be larger if the device implementing system 200 is operating in a battery-powered mode, and can be smaller if the device implementing system 200 is operating in a plugged-in mode).

The memory pressure refers to a state of flux or the churn of physical memory. A state of flux or churn of physical memory is a measure of how frequently memory pages are being transferred to and/or from a storage device (e.g., storage device 108 of FIG. 1). Page combine policy module 204 indicates to page combination module 212 to perform the identification and combination process at smaller intervals (e.g., a fewer number of minutes) if memory pages are being transferred to and/or from a storage device at less than a threshold rate, and at larger intervals (e.g., a larger number of minutes) if memory pages are being transferred to and/or from a storage device at least that threshold rate.

The memory contents refers to an amount of change in the content of pages of physical memory. The amount of change in the content of pages of physical memory is, for example, a measure of a rate at which new pages are being allocated by allocation module 216. Page combine policy module 204 indicates to page combination module 212 to perform the page combination procedure process only if the rate at which new pages are being allocated by allocation module 216 exceeds a threshold amount. This threshold amount can be a fixed number (e.g., a particular number of megabytes (such as 10) over a particular amount of time (such as 15 minutes)) or a relative number (e.g., a particular percentage of the number of pages in memory being used over a particular amount of time).

The system startup refers to how soon after booting or start up of system 200 (or of the device implementing system 200) the page combination procedure is to be performed. Page combine policy module 204 indicates to page combination module 212 to perform the page combination procedure a threshold amount of time after booting or start up of the device or system. This threshold of time can be a particular number of seconds (e.g., 40), minutes, and so forth.

It should be noted that processes 206 and 208 need have no knowledge of, and typically are unaware of, the combining of memory pages having identical content techniques discussed herein. Processes 206 and 208 issue requests to access memory and these requests are responded to by memory manager 202. Processes 206 and 208 are unaware of whether a request involves a page that may be a combined page, and of any of the page combination procedure (or splitting of a combined page) discussed herein.

Figure 3:
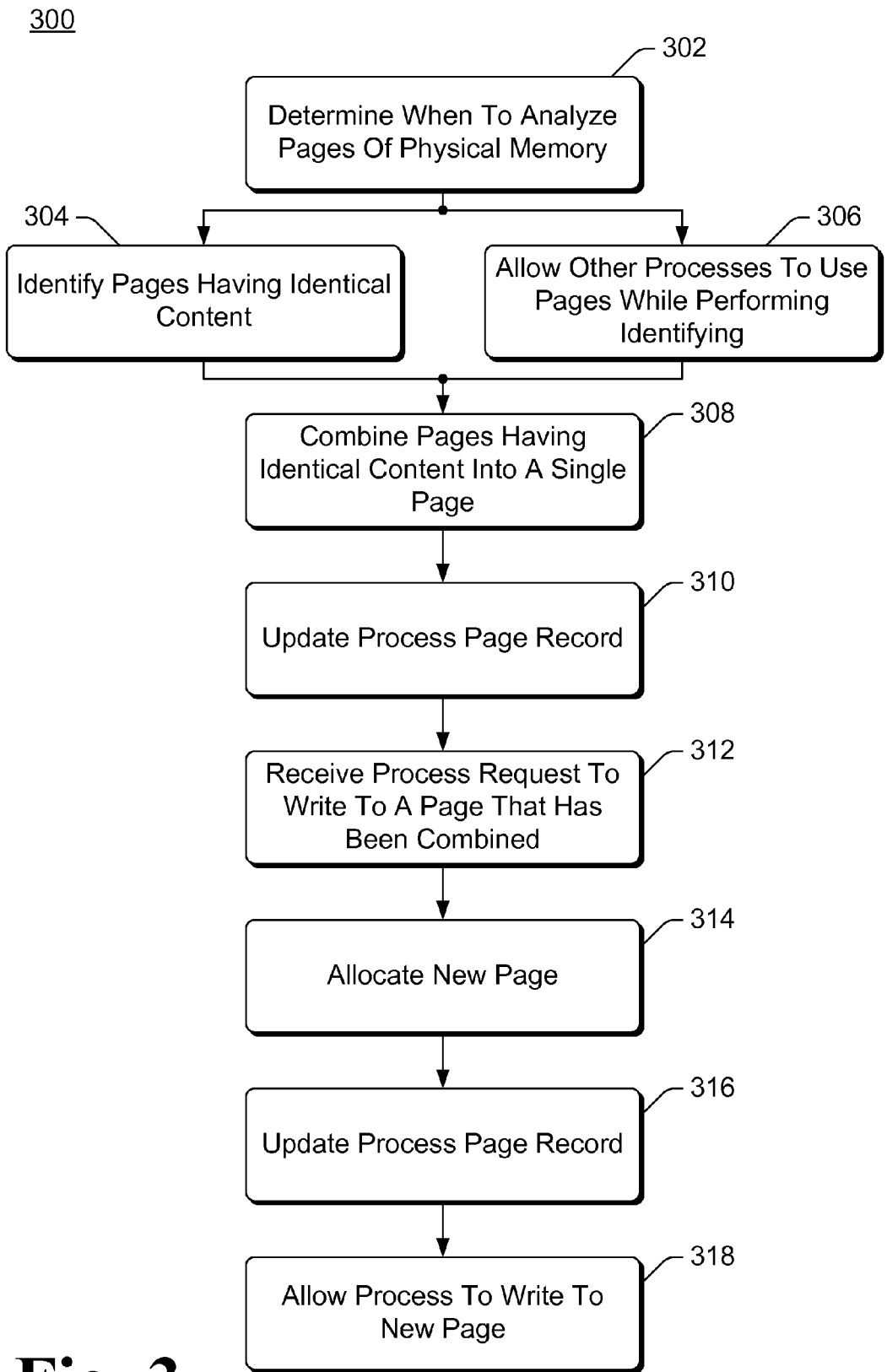
FIG. 3 is a flowchart illustrating an example procedure for combining and splitting memory pages in accordance with one or more embodiments.

FIG. 3 is a flowchart illustrating an example procedure 300 for combining and splitting memory pages in accordance with one or more embodiments. Procedure 300 is carried out by a system, such as system 100 of FIG. 1 and/or system 200 of FIG. 2, and can be implemented in software, firmware, hardware, or combinations thereof. Procedure 300 is shown as a set of acts and is not limited to the order shown for performing the operations of the various acts. Procedure 300 is an example process for combining and splitting memory pages; additional discussions of combining and splitting memory pages are included herein with reference to different figures.

In procedure 300, a determination is made as to when to analyze pages of physical memory (act 302). This determination can be made in different manners as discussed above, such as based on input from a page combine policy module that evaluates various policies.

In response to it being time to analyze pages of physical memory, multiple pages (if any) having identical content are identified (act 304). This identification can be performed, for example, by generating CRC values and comparing pages having the same CRC values as discussed above. The pages of physical memory that are analyzed for identification of identical content can be all pages in physical memory, pages in particular portions of physical memory, specific physical page ranges, and so forth.

In parallel or concurrently with the identification in act 304, other processes running on the device or in the system implementing procedure 300 can use the pages of physical memory (act 306). A received request that could potentially result in a memory coherency or corruption situation, or that may alter the content of a page, causes analysis of the page to be skipped or otherwise terminated as discussed above. Such requests in act 306 include requests to change cache attributes of pages as discussed above.

Multiple pages having identical content are combined into a single combined page (act 308). This single page can be a newly allocated page or one of the multiple pages as discussed above.

Additionally, a process page record is updated (act 310). The process page record can be one or more process page tables as discussed above, and is updated so that entries in the record that previously pointed to one of the multiple pages having identical content instead point to the combined page.

Subsequently, a request is received from a process to write to a page that has been combined (act 312). In response to the request, a new page of memory is allocated (act 314), and the process page record is updated so that the entry in the record for that process that previously pointed to the combined page instead points to the newly allocated page (act 316).

The process is then allowed to write to the newly allocated page (act 318). The memory manager responds to the write request based on the newly allocated page rather than the combined page as discussed above.

Figure 4:
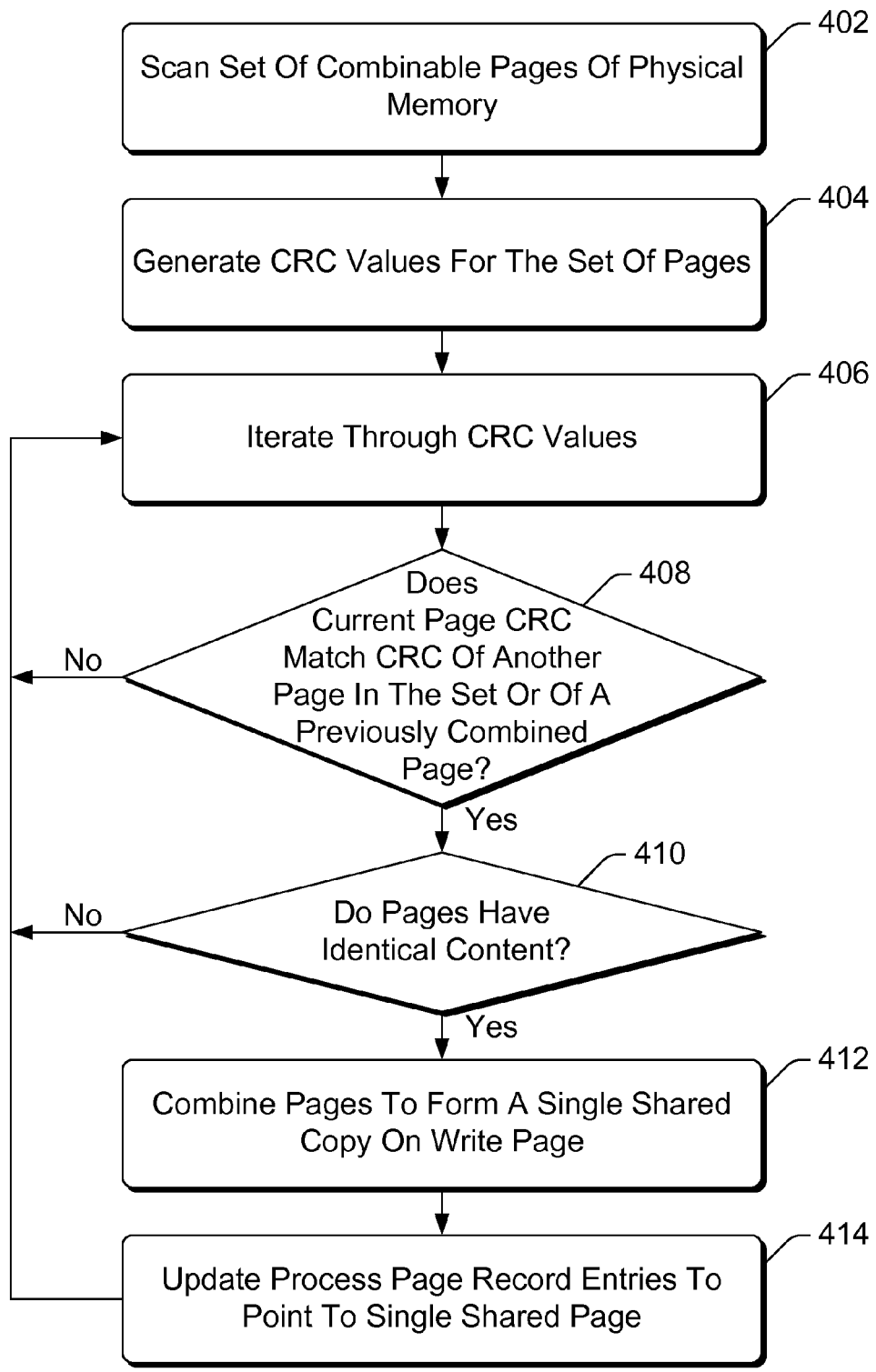
FIG. 4 is a flowchart illustrating an example procedure for combining memory pages having identical content in accordance with one or more embodiments.

FIG. 4 is a flowchart illustrating an example procedure 400 for combining memory pages having identical content in accordance with one or more embodiments. Procedure 400 is carried out by a system, such as system 100 of FIG. 1 and/or system 200 of FIG. 2, and can be implemented in software, firmware, hardware, or combinations thereof. Procedure 400 is shown as a set of acts and is not limited to the order shown for performing the operations of the various acts. Procedure 400 is an example process for combining memory pages having identical content; additional discussions of combining memory pages having identical content are included herein with reference to different figures.

In procedure 400, a set of combinable pages of physical memory are scanned (act 402), and CRC values for each page of the set of pages are generated (act 404). Alternatively, values other than the CRC values can be generated as discussed above.

Procedure 400 then iterates through analyzing the generated CRC values (act 406), checking whether the CRC value of a current page being analyzed matches the CRC value of another page in the set of pages for which CRC values were generated in act 404 or the CRC value of a previously combined page (act 408). Such a previously combined page is typically a combined page generated during a previous running of procedure 400. The CRC values can optionally be sorted prior to being iterated through as discussed above.

If the CRC value of the current page being analyzed does not match the CRC value of another page in the set of pages for which CRC values were generated in act 404 or a previously combined page, then procedure 400 continues iterating through CRC values (act 406). However, if the CRC value of the current page being analyzed does match the CRC value of another page in the set of pages for which CRC values were generated in act 404 or a previously combined page, then a check is made as to whether the pages having matching CRC values have identical content (act 410).

If pages having matching CRC values do not have identical content, then procedure 400 continues iterating through CRC values (act 406). However, if pages having matching CRC values do have identical content, then the multiple pages are combined to form a single combined (shared) page (act 412). This combined page is a "copy on write" page as discussed above.

Additionally, a process page record is updated so that entries in the record that previously pointed to one of the multiple pages having identical content instead point to the combined page (act 414). The process page record can be one or more process page tables as discussed above. A reference count associated with the combined page is also generated or incremented to reflect the number of pages that point to the combined page as discussed above.

Figure 5:
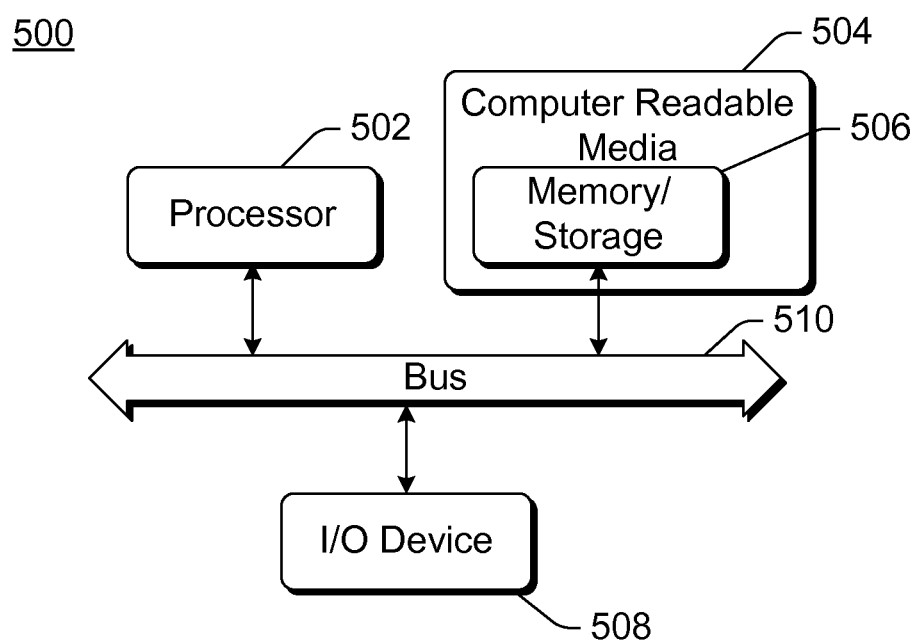
FIG. 5 illustrates an example computing device that can be configured to implement the combining memory pages having identical content in accordance with one or more embodiments.

FIG. 5 illustrates an example computing device 500 that can be configured to implement the combining memory pages having identical content in accordance with one or more embodiments. Computing device 500 can implement, for example, system 100 of FIG. 1 and/or system 200 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the combining memory pages having identical content techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a device having a memory accessed as multiple pages, the method comprising:
   identifying two or more pages of the multiple pages having identical content, the identical content including at least the two or more pages having the same page protections, the same page protections identifying how the two or more pages may be used including at least one of read, write, or execute, the identifying the two or more pages including at least generating a check value for each of the multiple pages;
   allowing, while the two or more pages are being identified, other processes running on the device to use the two or more pages including allowing the other processes to change cache attributes of each of the two or more pages;
   combining the two or more pages into a single combined page; and
   updating a process page record having multiple entries pointing to the multiple pages so that entries that previously pointed to one of the two or more pages instead point to the single combined page, the other processes being unaware of the identifying, combining, and updating while the two or more pages are being identified, the process page record including at least an identifier for each of the multiple pages indicating when the generating the check value is being done.

2. A method as recited in claim 1, the allowing comprising:
   ceasing analyzing a page to determine whether the page may have identical content as one or more other pages of the multiple pages in response to a request that can potentially result in a memory coherency or corruption situation being received while analyzing the page; and
   allowing the request to be performed.

3. A method as recited in claim 1, further comprising performing the identifying, allowing, combining, and updating in response to an indication from a user mode page combine policy module to analyze the multiple pages.

4. A method as recited in claim 3, the user mode page combine policy module generating the indication based at least in part on various aspects of the device that are monitored by the user mode page combine policy module.

5. A method as recited in claim 1, the combining comprising allocating a new page of the memory as the single combined page, and the updating the process page record comprising updating the process page record so that each entry that previously pointed to one of the two or more pages instead points to the new page.

6. A method as recited in claim 5, the new page being allocated in a way that reduces physical memory fragmentation.

7. A method as recited in claim 1, the check value being a cyclic redundancy check (CRC) value, the identifying comprising:
   identifying ones of the multiple pages having matching CRC values; and
   comparing the ones of the multiple pages having matching CRC values to determine which of the ones, if any, have identical content.

8. A method as recited in claim 7, the multiple pages including previously combined pages.

9. A method as recited in claim 8, the previously combined pages including one or more previously combined pages that have been transferred to a storage device.

10. A method as recited in claim 1, further comprising, in response to a request from one of the other processes to write to a memory address included in one of the two or more pages:
    allocating a new page in the memory;
    copying the content of the single combined page to the new page; and
    updating the process page record so that an entry for the process from which the request was received that previously pointed to the combined page instead points to the new page.

11. A method as recited in claim 10, further comprising
    repeating the allocating, copying, and updating the process page record in response to each of multiple additional write requests to memory addresses included in one of the two or more pages; and
    de-allocating the combined page when a reference count indicates that no more process page record entries point to the combined page.

12. One or more computer storage memories having stored thereon multiple instructions that, when executed by one or more processors of a device having a memory accessed as multiple pages, implement a page combination procedure by causing the one or more processors to:
    identify two or more pages of the multiple pages having identical content, the identical content including at least the two or more pages having the same page protections, the same page protections identifying how the two or more pages may be used including at least one of read, write, or execute, the identify the two or more pages including at least generating a check value for each of the multiple pages;
allocate a new page of the multiple pages, the new page having the identical content as the two or more pages;
update a process page record having multiple entries pointing to the multiple pages so that entries that previously pointed to one of the two or more pages instead point to the new page, the process page record including at least an identifier for each of the multiple pages indicating when the generating the check value is being done; and
cause one or more additional processes running on the device other than a process implementing the page combination procedure to be unaware of the identification, allocation, and updating.

13. One or more computer storage memories as recited in claim 12, wherein the check value is a cyclic redundancy check (CRC) value and to identify two or more pages is to:
identify ones of the multiple pages having matching CRC values; and
compare the ones of the multiple pages having matching CRC values to determine which of the ones, if any, have identical content.

14. One or more computer storage memories as recited in claim 13, the multiple pages including previously combined pages.

15. One or more computer storage memories as recited in claim 14, the previously combined pages including one or more previously combined pages that have been transferred to a storage device.

16. One or more computer storage memories as recited in claim 12, wherein the instructions further cause the one or more processors to, in response to a request to write to a memory address included in one of the two or more pages:
allocate an additional new page in the memory;
copy the content of the new page to the additional new page; and
update the process page record so that an entry for a process from which the request was received that previously pointed to the new page instead points to the additional new page.

17. One or more computer storage memories as recited in claim 12, the new page being allocated in a way that reduces physical memory fragmentation.

18. A method in a device having a memory accessed as multiple pages, the method comprising:
determining, in response to an indication received from a user mode page combine policy module, to perform a page combination procedure, the indication occurring in response to a user being away from the device for a threshold amount of time, an increase of a threshold amount of memory being used within a particular amount of time, or a rate at which new pages are being allocated exceeds a threshold amount, the threshold amount of memory based on a total number of pages comprising the multiple pages;
identifying, as part of the page combination procedure, two or more pages of the multiple pages having identical content, the identical content including at least the two or more pages having the same page protection, the multiple pages including previously combined pages that have been transferred to a storage device, the identifying the two or more pages including at least generating a check value for each of the multiple pages;
allowing, while the two or more pages are being identified, other processes running on the device to use the two or more pages including allowing the other processes to change cache attributes of each of the two or more pages;
combining, as part of the page combination procedure, the two or more pages into a single combined page by allocating a new page of the multiple pages and copying the content of one of the two or more pages to the new page; and
updating, as part of the page combination procedure, a process page record having multiple entries pointing to the multiple pages so that entries that previously pointed to one of the two or more pages instead point to the single combined page, the other processes being unaware of the identifying, combining, and updating while the two or more pages are being identified, the process page record including at least an identifier for each of the multiple pages indicating when the generating the check value is being done.

19. A method as recited in claim 18, wherein the new page comprises the same attributes and page protections as the two or more pages being combined.

20. A method as recited in claim 18, the new page being allocated in a way that reduces physical memory fragmentation.

* * * * *